(12) United States Patent
Lai

(10) Patent No.: US 10,130,194 B1
(45) Date of Patent: Nov. 20, 2018

(54) TOOL HANGER

(71) Applicant: Jin-Lan Lai, Taichung (TW)

(72) Inventor: Jin-Lan Lai, Taichung (TW)

( * ) Notice: Subject to any disclaimer, the term of this patent is extended or adjusted under 35 U.S.C. 154(b) by 0 days.

(21) Appl. No.: 15/782,176

(22) Filed: Oct. 12, 2017

(51) Int. Cl.
*A47F 5/00* (2006.01)
*B65G 1/10* (2006.01)
*A47F 7/00* (2006.01)

(52) U.S. Cl.
CPC .......... *A47F 5/0006* (2013.01); *A47F 7/0021* (2013.01); *B65G 1/10* (2013.01); *A47F 2005/0012* (2013.01)

(58) Field of Classification Search
CPC .................. A47F 5/0006; A47F 7/0021; A47F 2005/0012; B65G 1/10; B25H 3/003; B25H 3/04; B25H 3/06; B25B 13/56; B25B 13/06
USPC .......................................... 211/69.5; 206/378
See application file for complete search history.

(56) References Cited

U.S. PATENT DOCUMENTS

| | | | | |
|---|---|---|---|---|
| 4,337,860 A * | 7/1982 | Carrigan | ................ | B25H 3/003 206/376 |
| 5,228,570 A * | 7/1993 | Robinson | ................ | B25H 3/06 206/375 |
| 5,398,823 A * | 3/1995 | Anders | ................ | B25H 3/003 206/378 |
| 5,467,874 A * | 11/1995 | Whitaker | ............ | B25B 23/0035 206/378 |
| 5,501,342 A * | 3/1996 | Geibel | ................ | B25H 3/003 206/350 |
| 6,070,745 A * | 6/2000 | Dembicks | ................ | B25H 3/06 206/378 |
| 6,168,018 B1 * | 1/2001 | Ramsey | ................ | B25H 3/06 206/378 |
| 6,386,363 B1 * | 5/2002 | Huang | ................ | B25H 3/003 206/1.5 |
| 6,488,151 B2 * | 12/2002 | Ramsey | ................ | B25H 3/06 206/378 |
| 6,698,600 B1 * | 3/2004 | Lee | ........................ | B25H 3/003 206/378 |
| 6,712,225 B2 * | 3/2004 | McNeely | ............... | B25H 3/003 206/378 |
| 6,991,105 B2 * | 1/2006 | Winnard | ................ | B25H 3/003 206/378 |
| 7,137,514 B1 * | 11/2006 | Nickipuck | ............... | B25H 3/04 211/70.6 |
| 7,841,480 B2 * | 11/2010 | Hsieh | ........................ | B25H 3/06 206/378 |

(Continued)

*Primary Examiner* — Patrick D Hawn
(74) *Attorney, Agent, or Firm* — Muncy, Geissler, Olds & Lowe, P.C.

(57) ABSTRACT

A tool hanger is provided, including: a base, configured to be slidably assembled within a track slot and including a wide section and at least one narrow section in a first direction, the wide section defining a first length dimension in a second direction, each narrow section defining a second length dimension in the second direction, the first length dimension is greater than the short side dimension, at least one side of the wide section having a resilient convex portion which is projecting toward the second direction; a socket combination member, rotatably attached to the base; wherein one of the base and the socket combination member has a hole, the other has a combination structure which is rotatably assembly within the hole. A tool hanger is also provided, including: a holder body and a base.

11 Claims, 9 Drawing Sheets

(56) References Cited

U.S. PATENT DOCUMENTS

| | | | | |
|---|---|---|---|---|
| 7,905,354 B1* | 3/2011 | Geibel | ............... | B25H 3/06 206/350 |
| 8,733,561 B2* | 5/2014 | Kao | ............... | B25H 3/04 206/378 |
| 8,733,562 B2* | 5/2014 | Kao | ............... | B25H 3/04 206/378 |
| 8,813,957 B1* | 8/2014 | Kao | ............... | B25H 3/003 206/378 |
| 9,126,329 B2* | 9/2015 | Kao | ............... | B25H 3/04 |
| 9,186,790 B1* | 11/2015 | Kao | ............... | B25H 3/06 |
| 9,205,553 B2* | 12/2015 | Ou | ............... | B25H 3/04 |
| 9,375,836 B2* | 6/2016 | Su | ............... | B25B 13/56 |
| 9,527,206 B1* | 12/2016 | Hsieh | ............... | B25H 3/003 |
| 9,782,890 B2* | 10/2017 | Hsieh | ............... | B25H 3/003 |
| 2004/0188366 A1* | 9/2004 | Tong | ............... | A47F 5/0838 211/70.6 |
| 2010/0065520 A1* | 3/2010 | Hsieh | ............... | B25H 3/06 211/70.6 |
| 2011/0089126 A1* | 4/2011 | Hsieh | ............... | B25H 3/003 211/70.6 |
| 2012/0138553 A1* | 6/2012 | Kao | ............... | B25H 3/06 211/70.6 |
| 2013/0037498 A1* | 2/2013 | Kao | ............... | A47F 5/0838 211/59.2 |
| 2013/0062480 A1* | 3/2013 | Kao | ............... | B25H 3/04 248/201 |
| 2013/0306581 A1* | 11/2013 | Kao | ............... | A47B 81/00 211/49.1 |
| 2015/0034518 A1* | 2/2015 | Kao | ............... | B65D 1/36 206/372 |
| 2015/0034572 A1* | 2/2015 | Kao | ............... | B25H 3/04 211/13.1 |
| 2015/0122750 A1* | 5/2015 | Kao | ............... | B25H 3/04 211/13.1 |
| 2015/0336262 A1* | 11/2015 | Kao | ............... | B25H 3/06 206/378 |
| 2016/0096264 A1* | 4/2016 | Kao | ............... | B25H 3/003 206/378 |
| 2016/0302592 A1* | 10/2016 | Kao | ............... | A47F 5/08 |
| 2017/0190047 A1* | 7/2017 | Kao | ............... | B25H 3/04 |

* cited by examiner

TOOL HANGER

BACKGROUND OF THE INVENTION

Field of the Invention

The present invention relates to a tool hanger.

Description of the Prior Art

Generally, a connecting rod is attached to a tool hanger for storage or exhibition, and the tool hanger is disposed on the wall or exhibition board for purchase of consumers.

The conditional socket device includes a track base and a plurality of locking members, each locking members is slidaly assembled to the track base for being combined with a socket. However, each locking members is made in one piece so that each locking members cannot rotates relative to the track base when each locking members being assembled to the track base. Thereby, the consumers are hard to read labels identifying the number or size of the socket, so as to have a limitation in use.

The present invention is, therefore, arisen to obviate or at least mitigate the above mentioned disadvantages.

SUMMARY OF THE INVENTION

An object of the present invention is to provide a tool hanger, in which the tool hanger is movably assembled within a track slot and a socket combination member can be rotated relative to the track slot.

To achieve the above and other objects, a tool hanger is provided, configured to be assembled to a track slot which defining a short side dimension, the tool hanger including: a base, configured to be slidably assembled within the track slot and including a wide section and at least one narrow section in a first direction, the wide section defining a first length dimension in a second direction, each narrow section defining a second length dimension in the second direction, the second direction being transverse to the first direction, the first length dimension is greater than the short side dimension, the second length dimension is less than or equal to the short side dimension, at least one side of the wide section having a resilient convex portion which is projecting toward the second direction; a socket combination member, rotatably attached to the base; wherein one of the base and the socket combination member has a hole, and the other of the base and the socket combination member has a combination structure which is rotatably assembled within the hole.

To achieve the above and other objects, a tool hanger is provided, including: a holder body, having a track slot and a dovetail groove which are opposite to each, the track slot and the dovetail groove respectively extending along a lengthwise direction of the holder body, the track slot defining a short side dimension which is transverse to the lengthwise direction; a base, being slidably assembled within the track slot and including a wide section and at least one narrow section in a first direction, the wide section defining a first length dimension in a second direction, each narrow section defining a second length dimension in the second direction, the second direction being transverse to the first direction, the first length dimension is greater than the short side dimension, the second length dimension is less than or equal to the short side dimension, at least one side of the wide section having a resilient convex portion which is projecting toward the second direction; a socket combination member, rotatably attached to the base, one of the base and the socket combination member has a hole, the other has a combination structure which is rotatably assembled within the hole; and at least one end plug, disposed at one end of the holder body in the lengthwise direction, each end plug having a dovetail block and a magnetic member which is attached to the dovetail block, the dovetail block inserted into the dovetail groove.

The present invention will become more obvious from the following description when taken in connection with the accompanying drawings, which show, for purpose of illustrations only, the preferred in this embodiment(s) in accordance with the present invention.

DETAILED DESCRIPTION OF THE PREFERRED IN THIS EMBODIMENTS

Figure 1:
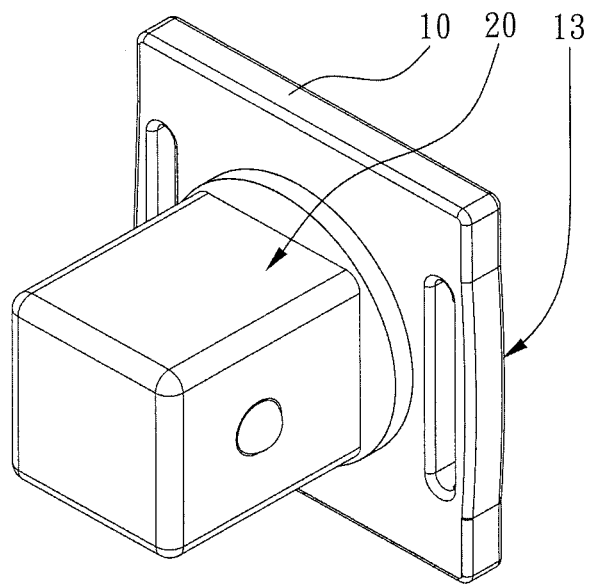
FIG. 1 is a perspective view of a tool hanger according to a preferred in this embodiment of the present invention.
Figure 2:
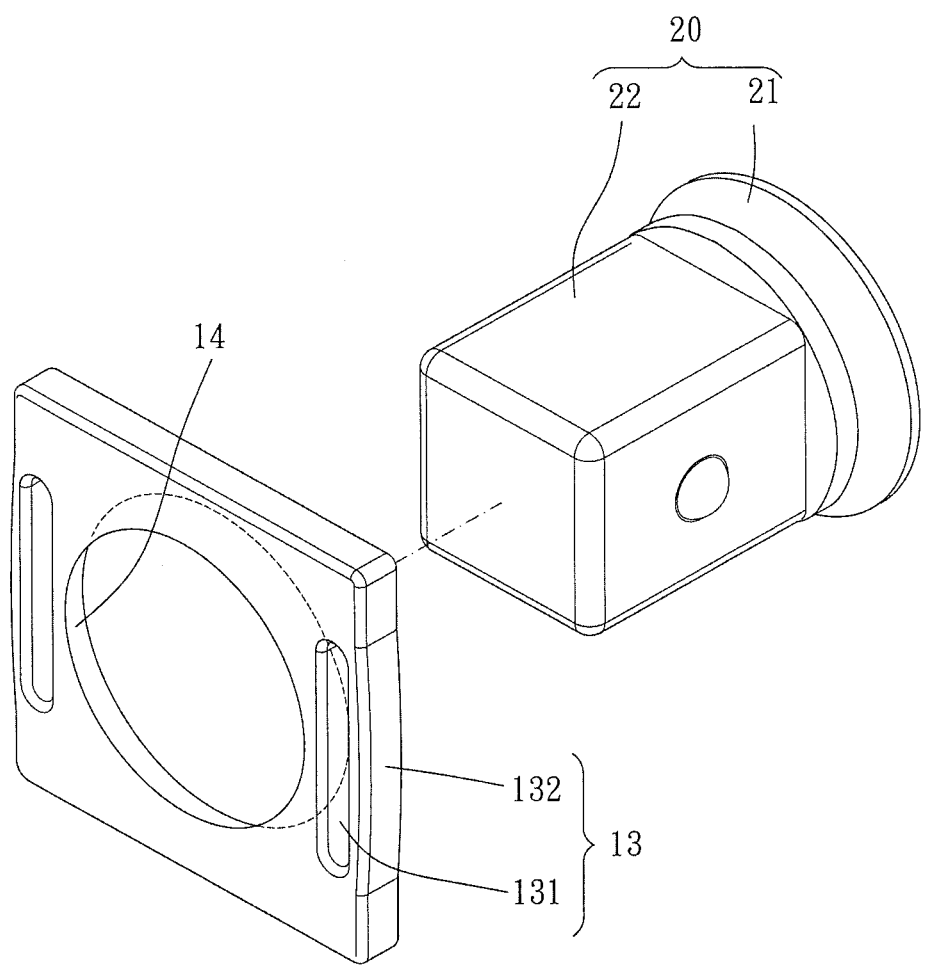
FIG. 2 is a breakdown drawing of a tool hanger according to a preferred in this embodiment of the present invention.
Figure 3:
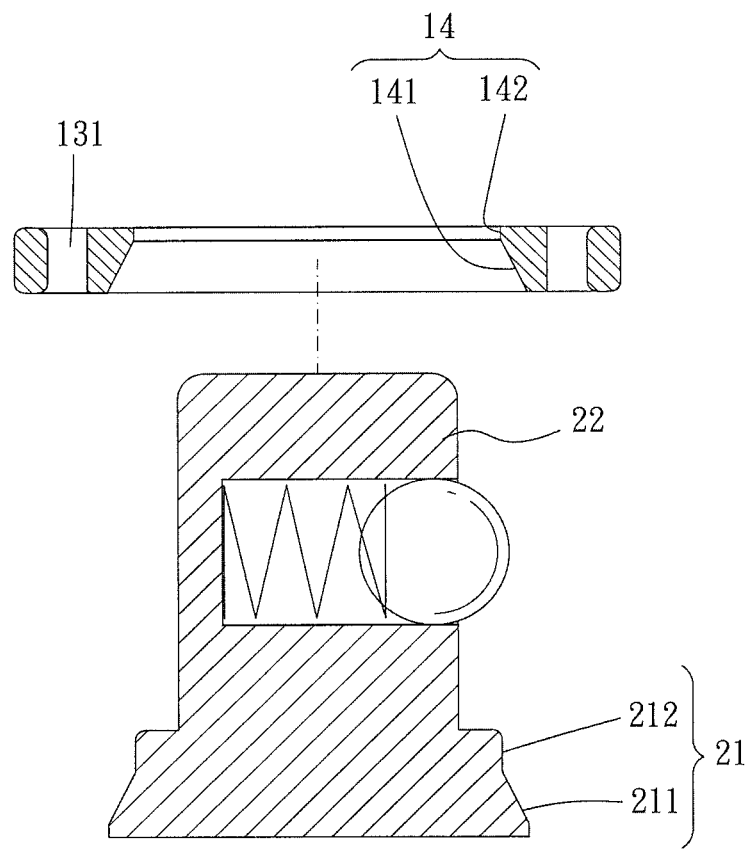
FIG. 3 is a cross-sectional view of a tool hanger according to a preferred in this embodiment of the present invention.
Figure 4:
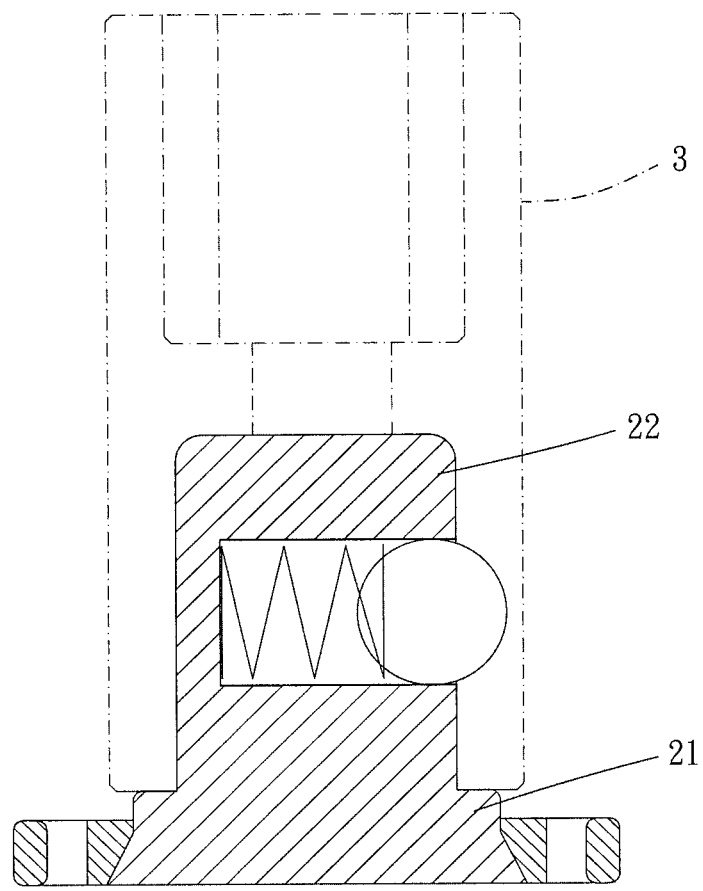
FIG. 4 is a breakdown cross-sectional view of a tool hanger according to a preferred in this embodiment of the present invention.

FIGS. 1 to 11, show a tool hanger according to a preferred in this embodiment of the present invention. The hanger 1 includes a base 10, a socket combination member 20, a holder body 31, and at least one end plug 40.

The holder body 31 has a track slot 2 and a dovetail groove 32 which are opposite to each other. The track slot 2 and the dovetail groove 32 respectively extend along a lengthwise direction of the holder body 31. The track slot 2 defines a short side dimension L1 which is transverse to the lengthwise direction. Each end plug 40 is disposed at one end of the holder body 31 in the lengthwise direction. Each end plug 40 can cover the track slot 2 and an opening of dovetail groove 32. Each the end plug 40 has a dovetail block 41 and a magnetic member 42 which is attached to the dovetail block 41, the dovetail block 41 is inserted into the dovetail groove 32, for providing a simple structure and can be detachably attached to a magnetically-attractable element. Moreover, the magnetic member 42 can be positioned in the dovetail groove 32 and not liable to slide relative to and removed from the dovetail groove 32 in the lengthwise direction. In this embodiment, the dovetail block 41 has a recess 43, and the magnetic member 42 is received in the recess 43.

The base 10 is slidably assembled within the track slot 2, the base 10 includes a wide section 11 and at least one narrow section 12 in a first direction, and the wide section 11 defines a first length dimension L2 in a second direction. Each narrow section 12 defines a second length dimension L3 in the second direction, the second direction is transverse to the first direction, the first length dimension L2 is greater than the short side dimension L1, the second length dimension L3 is less than or equal to the short side dimension L1, and at least one side of the wide section 11 has a resilient convex portion 13 which is projecting toward the second direction. The resilient convex portion 13 is configured to be abutted resiliently against the track slot 2. The socket combination member 20 is rotatably attached to the base 10. Wherein one of the base 10 and the socket combination member 20 has a hole, the other of the base 10 and the socket combination member 20 has a combination structure which is rotatably assembled within the hole. Thus, the base 10 is slidably positionally assembled within the track slot 2, and the socket combination member 20 can be rotated relative to the track slot 2, the socket combination member 20 is configured to be combined with a socket 3, so as to easily read labels identifying the number or size of the socket 3 on the outer surface of the socket 3.

Preferably, the socket combination member 20 is detachably combined with the base 10. In this embodiment, the base 10 has the hole 14 therethrough in a thickness direction, and the socket combination member 20 has the combination structure 21. In other embodiments, the hole can be a blind hole, a ring groove, etc.

In this embodiment, the socket combination member 20 has a mounting structure 22, the mounting structure 22 is configured to be connected with the socket 3, the mounting structure 22 is disposed at one end of the combination structure 21, the combination structure 21 is penetrated through the hole 14, and another end of the combination structure 21 which is opposite to the end connected with the mounting structure 22 flushes with the base 1. Thus, the track slot 2 can support the base 10 and the combination structure 21 stably, and can be disengaged the socket combination member 20 from the base 10 easily. In other embodiments, the combination structure 21 cannot be flushed with the base 10 and is disposed inside the hole 14. Preferably, the mounting structure 22 and the combination structure 21 are integrally formed of one piece, so as to strong structural strength.

In this embodiment, at least part of the combination structure 21 is engaged within the hole 14 so that the base 10 and the socket combination member 20 cannot be easily disengaged to each other. Specifically, the hole 14 includes a large-diameter hole 141 and a small-diameter hole 142. The combination structure 21 is an axis structure, and the axis structure includes a large-diameter section 211 assembled within the large-diameter hole 141 and a small-diameter section 212 assembled within the small-diameter hole 14. Therefore, the socket combination member 20 can be removed the hole 14 only from one side. Wherein the hole 14 is a taper hole, the combination structure 21 corresponds to the taper hole in shape. In this embodiment, the small-diameter hole 142 is the taper hole, the small-diameter section 212 corresponds to the taper hole in shape. The small-diameter section 212 is engaged within the small-diameter hole 142 so that the socket combination member 20 and the base 10 cannot be easily taken apart.

Figure 5:
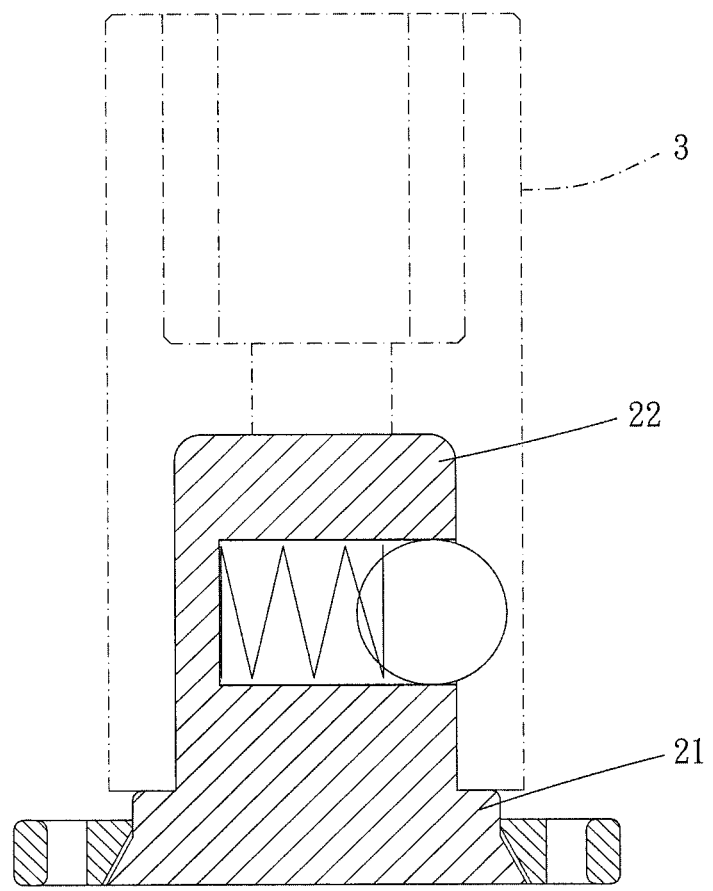
FIG. 5 is a breakdown cross-sectional view of another preferable in this embodiment of the present invention.
Figure 6:
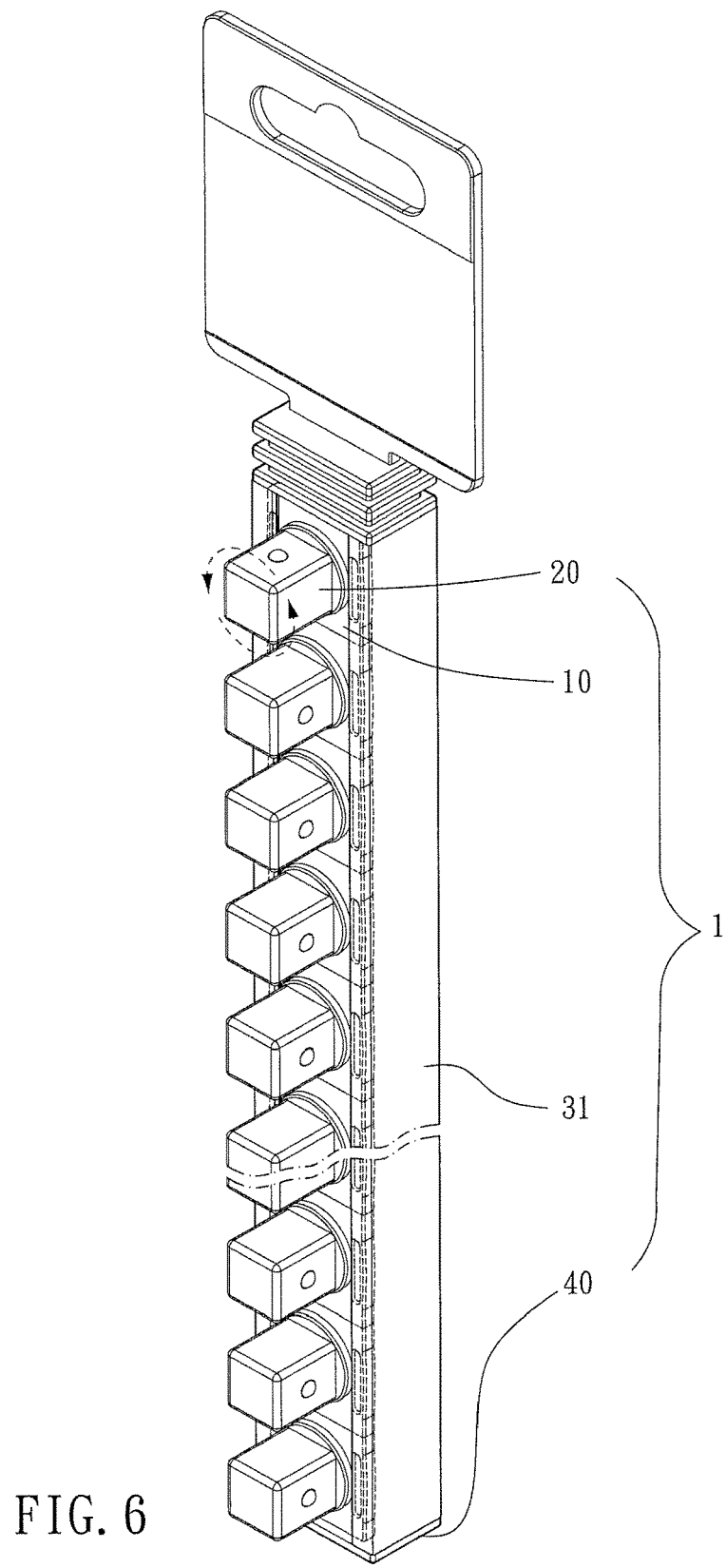
FIG. 6 is another perspective view of a tool hanger according to a preferred in this embodiment of the present invention.
Figure 7:
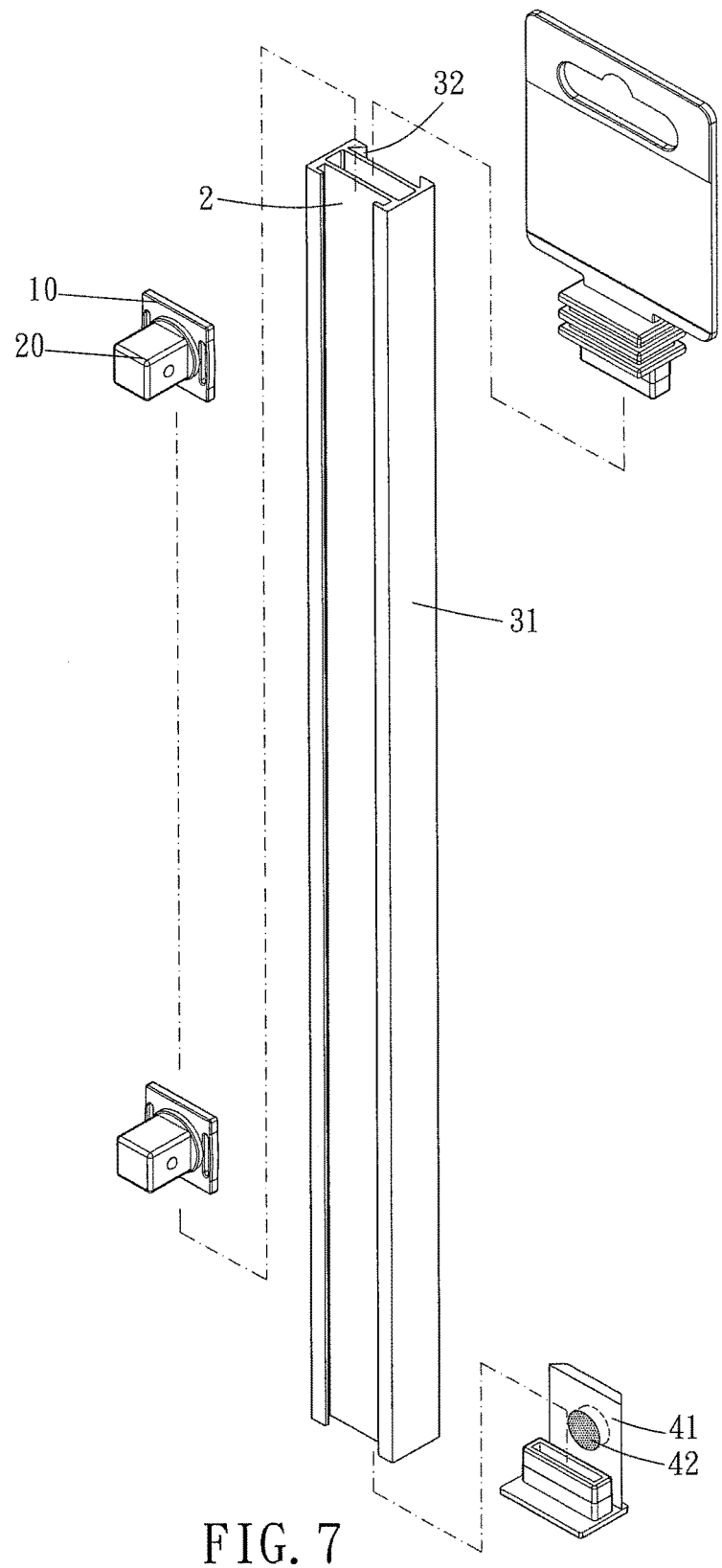
FIG. 7 is another perspective view of a tool hanger according to a preferred in this embodiment of the present invention.
Figure 8:
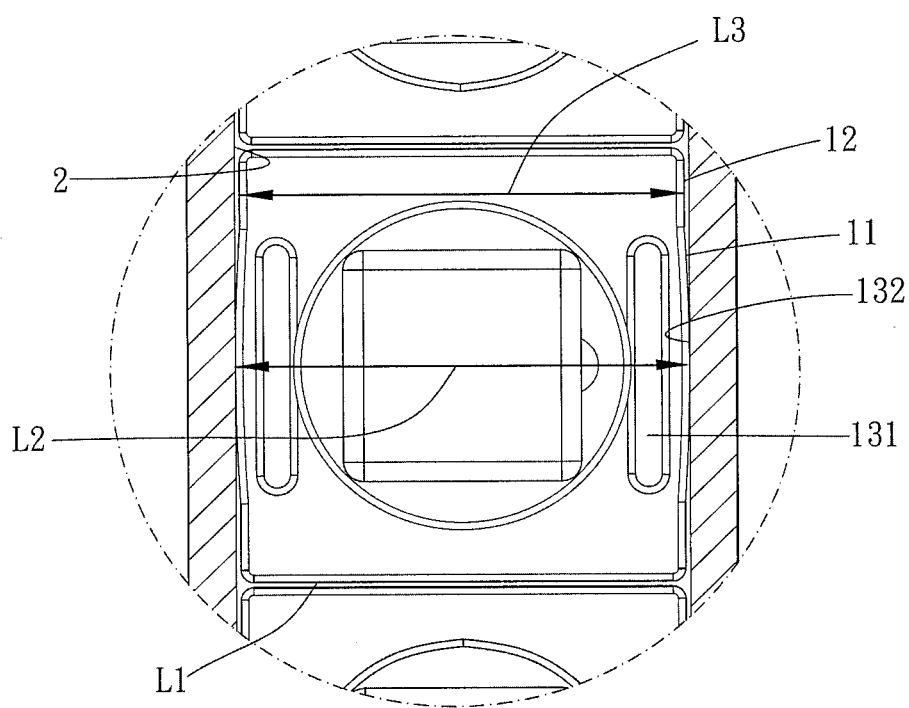
FIG. 8 is a partial cross-sectional view of FIG. 6.
Figure 9:
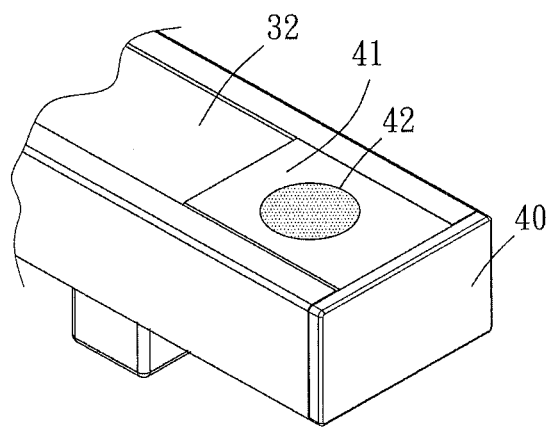
FIG. 9 is a partial perspective view of FIG. 6.
Figure 10:
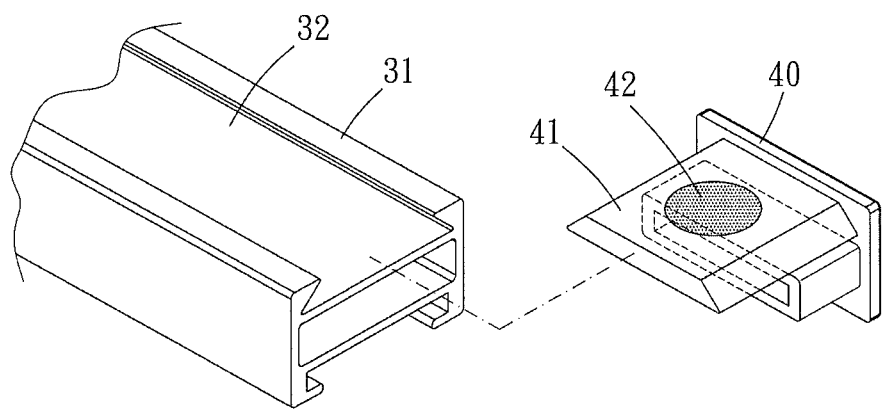
FIG. 10 is a breakdown drawing of FIG. 9.
Figure 11:
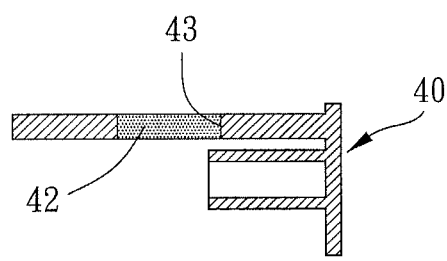
FIG. 11 is a cross-sectional view of an end plug according to a preferred in this embodiment of the present invention.

In other embodiment, such as FIG. 5, at least part of the large-diameter section 211 and the large-diameter hole 141 have a span therebetween so that the socket combination member 20 can be rotated relative to the base 10 smoothly.

Preferably, the base 10 and the socket combination member 20 are made of different materials. For example, the base 10 is made of flexible material and the socket combination member 20 is made of metal material. Of course, the base and the socket combination member can be made of the same material, or other different materials in other embodiments.

Besides, the resilient convex portion 13 includes a compression space 131 and a resilient convex surface 132 which is fortified the compression space 131 and extends outwardly. The compression space 131 and the resilient convex surface 132 are arranged in the second direction. The resilient convex surface 132 can be abutted against the track slot 2 in the second direction. Preferably, the compression space 131 is a through hole which extends along a thickness direction of the base 10, for providing sufficient space for deformation of the resilient convex surface 132. In this embodiment, the through hole is a continuous tubular hole. In other embodiments, the through hole can be a non-continuous hole.

Given the above, the base 10 is slidably positionably assembled within the track slot 2, and the socket combination member 20 can be rotated relative to the track slot 2, and the socket combination member 20 is for being combined with the socket 3, so as to easily read labels identifying the number or size of the socket 3 on the outer surface of the socket 3.

Although particular In this embodiments of the invention have been described in detail for purposes of illustration, various modifications and enhancements may be made without departing from the spirit and scope of the invention. Accordingly, the invention is not to be limited except as by the appended claims.

What is claimed is:

1. A tool hanger, configured to be assembled to a track slot which defines a short side dimension, the tool hanger including:
    a base, configured to be slidably assembled within the track slot and including a wide section and at least one narrow section in a first direction, the wide section defining a first length dimension in a second direction, each narrow section defining a second length dimension in the second direction, the second direction being transverse to the first direction, the first length dimension is greater than the short side dimension, the second length dimension is less than or equal to the short side dimension, at least one side of the wide section having a resilient convex portion which is projecting toward the second direction;
    a socket combination member, rotatably attached to the base;
    wherein one of the base and the socket combination member has a hole, and the other of the base and the socket combination member has a combination structure which is rotatably assembled within the hole;
    wherein the resilient convex portion includes a compression space and a resilient convex surface which is formed adjacent the compression space and extends outwardly, and the compression space and the resilient convex surface are arranged in the second direction;
    wherein the compression space is a through hole which extends along a thickness direction of the base.

2. The tool hanger of claim 1, wherein the socket combination member is detachably combined with the base.

3. The tool hanger of claim 1, wherein at least part of the combination structure is engaged within the hole.

4. The tool hanger of claim 1, wherein the hole includes a large-diameter hole and a small-diameter hole, the combination structure is an axis structure, and the axis structure includes a large-diameter section assembled within the large-diameter hole and a small-diameter section assembled within the small-diameter hole.

5. The tool hanger of claim 4, wherein at least part of the large-diameter section and the large-diameter hole have a span therebetween.

6. The tool hanger of claim 1, wherein the hole is a taper hole, and the combination structure corresponds to the taper hole in shape.

7. The tool hanger of claim 1, wherein the base has the hole therethrough in a thickness direction, and the socket combination member has the combination structure.

8. The tool hanger of claim 7, wherein the socket combination member has a mounting structure, the mounting structure is disposed at one end of the combination structure, the combination structure is penetrated through the hole, and another end of the combination structure which is opposite to the end connected with the mounting structure flushes with the base.

9. The tool hanger of claim 5, wherein the socket combination member is detachably combined with the base; the small-diameter hole is a taper hole, the small-diameter section corresponds to the taper hole in shape; the small-diameter section is engaged within the small-diameter hole; the base has the hole therethrough in a thickness direction, and the socket combination member has the combination structure; the socket combination member has a mounting structure, the mounting structure is disposed at one end of the combination structure, the combination structure is penetrated through the hole, and another end of the combination structure which is opposite to the end connected with the mounting structure flushes with the base; the mounting structure and the combination structure are integrally formed of one piece; and the base is made of flexible material and the socket combination member is made of metal material.

10. A tool hanger, including:
a holder body, having a track slot and a dovetail groove which are opposite to each other, the track slot and the dovetail groove respectively extending along a lengthwise direction of the holder body, the track slot defining a short side dimension which is transverse to the lengthwise direction;
a base, being slidably assembled within the track slot and including a wide section and at least one narrow section in a first direction, the wide section defining a first length dimension in a second direction, each narrow section defining a second length dimension in the second direction, the second direction being transverse to the first direction, the first length dimension is greater than the short side dimension, the second length dimension is less than or equal to the short side dimension, at least one side of the wide section having a resilient convex portion which is projecting toward the second direction;
a socket combination member, rotatably attached to the base, one of the base and the socket combination member has a hole, the other has a combination structure which is rotatably assembled within the hole; and
at least one end plug, disposed at one end of the holder body in the lengthwise direction, each end plug having a dovetail block and a magnetic member which is attached to the dovetail block, the dovetail block inserted into the dovetail groove;
wherein the resilient convex portion includes a compression space and a resilient convex surface which is formed adjacent the compression space and extends outwardly, and the compression space and the resilient convex surface are arranged in the second direction;
wherein the compression space is a through hole which extends along a thickness direction of the base.

11. The tool hanger of claim 10, wherein the dovetail block has a recess, the magnetic member is received in the recess.

* * * * *